US006536552B2

(12) United States Patent
Gotz

(10) Patent No.: US 6,536,552 B2
(45) Date of Patent: Mar. 25, 2003

(54) INDUSTRIAL TRUCK WITH SAFETY DEVICE

(75) Inventor: Bernhard Gotz, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/870,111

(22) Filed: May 30, 2001

(65) Prior Publication Data

US 2002/0017416 A1 Feb. 14, 2002

(30) Foreign Application Priority Data

Jun. 6, 2000 (DE) ........................................ 100 27 902

(51) Int. Cl.[7] ................................................. B62H 5/00
(52) U.S. Cl. ...................................................... 180/287
(58) Field of Search ................................ 180/287, 272, 180/271

(56) References Cited

U.S. PATENT DOCUMENTS 4,986,387 A * 1/1991 Thompson et al. ......... 180/212
5,931,254 A * 8/1999 Loraas et al. ............... 180/272

FOREIGN PATENT DOCUMENTS

JP 360135330 A * 7/1985 ................ 180/271

* cited by examiner

*Primary Examiner*—Paul N. Dickson
*Assistant Examiner*—Faye M. Fleming
(74) *Attorney, Agent, or Firm*—Webb Ziesenheim Logsdon Orkin & Hanson, P.C.

(57) ABSTRACT

An industrial truck includes a lifting apparatus, in particular a lifting mast, and a driver's workplace. To provide an industrial truck in which injuries caused by the operator touching the lifting apparatus can be effectively prevented, a safety device is provided which is effectively connected with a drive device of the lifting apparatus and/or of an actuator device of the lifting apparatus. In one advantageous embodiment, the safety device is effectively connected with a sensor device, whereby depending on the signal of the sensor device, the drive device of the lifting apparatus can receive a signal and/or the actuator device of the lifting apparatus can be enabled. The sensor device is located on a steering device, such as a steering wheel, and detects contact with the steering wheel by the driver's one hand.

12 Claims, 1 Drawing Sheet

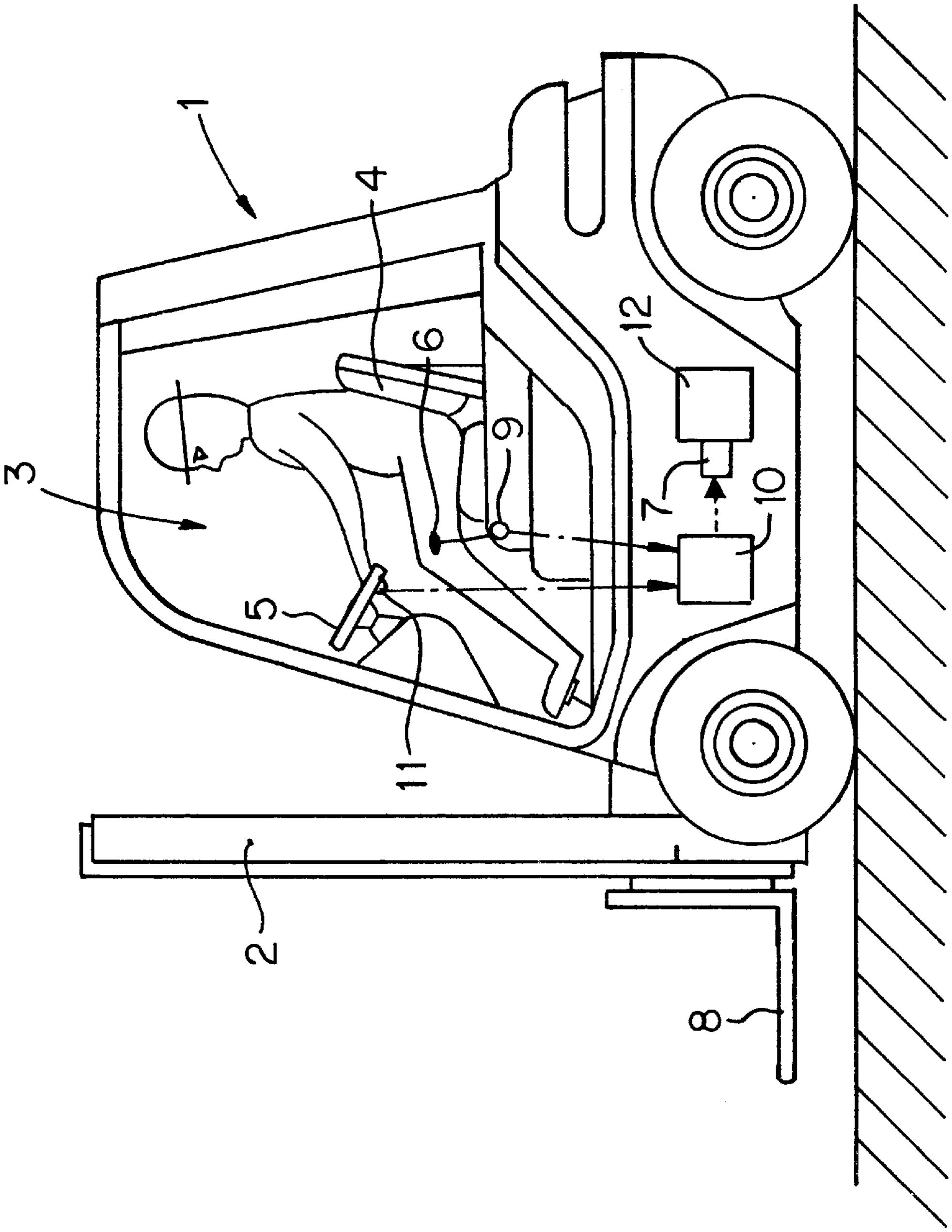
1
2
3
4
5
6
7
8
9
10
11
12

INDUSTRIAL TRUCK WITH SAFETY DEVICE

This application claims priority to German Application No. 100 27 902.3, filed Jun. 6, 2000, herein incorporated by reference in its entirety.

BACKGROUND OF THE INVENTION

1. Field of the Invention

This invention relates to an industrial truck with a lifting apparatus, in particular a lifting mast, and a driver's workplace.

2. Technical Considerations

The lifting apparatuses on industrial trucks of the prior art typically have a plurality of telescoping devices. Under certain conditions, the operator of an industrial truck can reach forward with one hand and touch the moving parts of the lifting apparatus while the lifting apparatus is actuated, for example by leaning or bending forward from the driver's workplace. The driver's fingers or hands can thereby be injured at shear points or pinch points in the vicinity of the moving parts of the lifting apparatus.

To prevent such injuries, the prior art teaches that the shear points and pinch points on the moving parts of the lifting apparatus can be protected against being touched. In the prior art, the shear points and pinch points are frequently protected with covers, protective grates, or panels, e.g., glass or Plexiglas panels. However, safety devices of this type frequently block or interfere with the driver's view of the lifting apparatus and the load holding means, such as a lifting fork with prongs, located on the lifting apparatus. Moreover, as accident statistics show, safety devices of the type described above frequently do not completely prevent injuries to the operator when the operator touches the moving lifting apparatus.

It is also possible to increase the distance between the driver's workplace and the lifting apparatus so that from the driver's workplace, the operator can no longer touch the lifting apparatus while simultaneously actuating the lifting apparatus. A distance of this magnitude, however, means that the overall dimensions of the industrial truck become larger or, if the position of the driver's workplace is unchanged, results in an increased weight of the front part of the lifting apparatus with a corresponding increase in the load moment. An industrial truck with an increased distance between the lifting apparatus and the driver's workplace therefore has a lower load carrying capacity.

Therefore, it is an object of this invention is to provide an industrial truck of the type described above in which injuries caused by the operator touching the lifting apparatus can be prevented or reduced.

SUMMARY OF THE INVENTION

The invention teaches that a safety device is provided that is effectively, e.g., operationally, connected with a drive device of the lifting apparatus and/or an actuator device of the lifting apparatus. By means of a safety device that is effectively connected with the drive device of the lifting apparatus and/or the actuator device of the lifting apparatus, it can be ensured in a simple manner that the lifting apparatus can only be operated under operating conditions in which the driver cannot touch the moving parts of the lifting apparatus. Injuries caused by touching the actuated lifting apparatus can therefore be prevented in a simple manner. The invention teaches that no safety devices are necessary on the lifting apparatus itself that interfere with the driver's view. The driver's workplace can also be located in the immediate vicinity of the lifting apparatus, as a result of which the front portion of the industrial truck can be kept compact and thus has a lower load moment.

In one preferred embodiment of the invention, the safety device is effectively connected with a sensor device. As a function of the signal from the sensor device, the drive device of the lifting apparatus can receive a signal and/or the actuator device of the lifting apparatus can be enabled. By means of the sensor device, it can be determined easily and reliably whether the operator is touching the lifting mast or not. The safety device allows the drive device to receive a signal or enables the actuator device of the lifting apparatus only if the driver is not touching the lifting apparatus.

In another embodiment of the invention, the sensor device is realized in the form of a safety device that is actuated by an operator's hand. Using a sensor device of this type, it can easily be detected whether the operator's hand is on the sensor device and the sensor device is actuated. The signal from the actuated sensor device enables or actuates the drive device and/or the actuator device of the lifting apparatus, as a result of which it can easily be ensured that the lifting apparatus can be actuated only when one of the operator's hands is on the sensor device and the operator's other hand is actuating the actuator device, meaning that the operator does not have any hands free to touch the moving parts of the lifting apparatus. The sensor device can thereby be located in any convenient or suitable position in the vicinity of the driver's workplace.

In a still further embodiment of the invention, the sensor device is located on a steering device, such as a steering wheel, and detects contact by the operator's hand with the steering wheel. With a sensor device that is located on the steering wheel, it can easily be determined whether or not the driver is touching the lifting apparatus. If the sensor device located on the steering wheel detects that one of the driver's hands is in contact with the steering wheel and is therefore on the steering wheel, it can be ensured in a simple manner that when the actuator device of the lifting apparatus is actuated by the operator's other hand, the operator has no hands free to touch the lifting apparatus. The lifting apparatus can thus be actuated without any risk of injury to the operator. The actuator device can advantageously be realized in the form of a joystick.

In an additional embodiment, the safety device includes an electronic control device that is effectively, e.g., operationally, connected with the sensor device, the actuator device, and/or the drive device of the lifting apparatus such that as a function of the signal from the sensor device, the signal of the actuator device can be enabled and/or the drive device can receive the signal. By means of an electronic control device, the signal of the actuator device, such as a joystick, for example, can easily be enabled to actuate the lifting apparatus or the drive device can receive a signal as a function of the signal from the actuator device only if a signal is detected by the sensor device that indicates the presence of the operator's hand.

The sensor can be realized in the form of a sensor that detects contact by the operator's hand with the steering wheel, such that in an operating situation in which the sensor device reports contact between the steering wheel and the operator's hand, the signal from the actuator device can be enabled. It is thereby possible to ensure in a simple manner that only when the operator is touching the steering wheel with one hand can the operator actuate the lifting apparatus by actuating the actuator device with the other hand. This procedure ensures that the lifting apparatus can be actuated only under operating conditions in which the operator does not have any hands free to touch the moving parts of the lifting apparatus.

In another embodiment, the industrial truck is realized in the form of a driver-controlled fork lift truck with a driver's workplace that faces the lifting apparatus. On industrial trucks of this type, in which the operator can touch the lifting apparatus by bending or leaning forward from the driver's workplace, the safety device taught by the invention can effectively and easily prevent injuries to the operator caused by touching the lifting apparatus.

BRIEF DESCRIPTION OF THE DRAWING

Additional advantages and details of the invention are explained in greater detail below with reference to the exemplary embodiment illustrated in the accompanying schematic FIGURE which shows a side view of an industrial truck incorporating features of the invention.

DESCRIPTION OF THE PREFERRED EMBODIMENTS

The FIGURE shows an industrial truck 1 in the form of a fork lift truck having a front-facing seat, a lifting apparatus 2 in the form of a lifting mast, and a driver's workplace 3. In this case, the driver's workplace 3 faces the lifting apparatus 2 and is provided with a driver's seat 4, a steering device 5 (e.g., a steering wheel), and at least one actuator device 6 for the lifting apparatus. The actuator device 6 can be any conventional type, such as but not limited to, an electric or hydraulic switch, a lever, or, most preferably, a joystick. By means of the actuator device 6, a pump and a drive device 7 for the lifting apparatus 2, which drive device 7 comprises a control valve, can be actuated so that a movable load holding device or load holding means 8, such as a pair of forks or a platform, located on the lifting apparatus 2 can be raised and lowered as a function of the signal of the actuator device 6, e.g., actuation or movement of the actuator device 6 in a selected direction raises or lowers the holding device 8. The drive device 7 of the lifting apparatus 2 further includes a drive motor 12, which can be, for example, an internal combustion engine or an electric motor.

Located on or operationally connected to the actuator device 6 is a sensor device 9 (i.e., an actuator sensor device) that detects actuation or movement of the actuator device 6 and is connected with an electronic control device 10. The sensor device 9 can be of any conventional type, such as but not limited to, a pressure switch, a photo-optical movement sensor, or a mechanical or electrical contact or switch. The electronic control device 10 is connected on the output side with the drive device 7 of the lifting apparatus 2 and can, for example, actuate the control valve that controls the lifting and lowering movement of the load holding means 8. The control device 10 can also optionally be connected to the drive motor 12, such that the load holding means 8 can be operated at a speed of movement and direction of movement that can be specified by the actuator device 6, e.g., the farther the actuator device 6 is moved in a given direction the faster the holding means 8 moves in that direction.

The invention teaches that a safety device is provided that has a sensor device 11 located in the vicinity of the driver's workplace 3. For example, the sensor device 11 can be a steering sensor device located on the steering device 5, e.g., a steering wheel. The sensor device 11 detects whether at least one of the driver's hands is in contact with the steering device 5. The sensor device 11 is connected with the electronic control device 10. The sensor device 11 can be of any conventional type, such as but not limited to, a mechanical or electrical contact or switch, a photo-optical movement sensor, or a pressure sensor.

In this case, the electronic control device 10 is configured such that when a signal is supplied by the sensor device 11 that detects contact between the steering device 5 and one of the driver's hands, the signal from the sensor device 9 and thus the signal of the actuator device 6 is enabled so that the lifting apparatus 2 is actuated and the load holding means 8 can be raised and/or lowered as a function of the deflection of the actuator device 6. The invention thus ensures in a simple manner that only when one of the operator's hands is in contact with the steering device 5 and is thus holding the steering wheel and the driver's other hand is actuating the actuator device 6, can the lifting apparatus 2 be actuated. This measure ensures that the driver has no hands free to touch the lifting apparatus 2, which can effectively prevent injuries to the operator caused by touching the moving parts of the actuated lifting apparatus.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:

a lifting apparatus having a drive device;

an actuator device for controlling movement of the lifting apparatus;

a driver's workplace; and a safety device connected with at least one of the drive device of the lifting apparatus and the actuator device, wherein the safety device comprises:

a first sensor device located on a steering device and configured to detect a hand of an operator; and a second sensor device connected to the actuator device configured to detect operation of the actuator device, such that the lifting apparatus is operational only when the first sensor device detects the presence of one of an operator's hands and the second sensor device detects operation of the actuator device to ensure that an operator is not touching the lifting apparatus.

2. The industrial truck as claimed in claim 1, wherein the drive device of the lifting apparatus is configured to receive a signal fro the first sensor device, the actuator device of the lifting apparatus is enabled as a function of the signal from the first sensor device.

3. The industrial truck as claimed in claim 2, wherein the safety device includes an electronic control device connected with at least one of the first sensor device, the second sensor device, the actuator device, and the drive device of the lifting apparatus, such that the signal of the actuator device is enabled and/or the drive device is actuated depending on the signal from at least one of to the first sensor device and the second sensor device.

4. The industrial truck as claimed in claim 3, wherein the steering device is a steering wheel and the signal of the actuator device is enabled in an operating situation when the first sensor device indicates contact with the steering wheel by the operator's hand.

5. The industrial truck as claimed in claim 2, wherein the actuator device is a joystick.

6. The industrial truck as claimed in claim 1, wherein the actuator device is a joystick.

7. The industrial truck as claimed in claim 6, wherein the safety device includes an electronic control device connected with at least one of the first sensor device, the actuator device, the second sensor device, and the drive device of the lifting apparatus, such that the signal of the actuator device is enabled and/or the drive device is actuated depending on the signal from at least one of the first sensor device and the second sensor device.

8. The industrial truck as claimed in claim 7, wherein the signal of the actuator device is enabled in an operating situation when the first sensor device indicates contact with the steering wheel by one hand of the driver.

9. The industrial truck as claimed in claim 1, wherein the industrial truck is a driver-controlled fork-lift truck with a driver's workplace that faces the lifting apparatus.

10. The industrial truck as claimed in claim 1, wherein the lifting apparatus comprises a lifting mast.

11. The industrial truck as claimed in claim 1, wherein the steering device is a steering wheel.

12. An industrial truck, comprising:

a driver's seat;

a steering wheel;

a lifting apparatus having a holding device;

a drive device connected to the lifting apparatus and configured to raise and lower the holding device;

an electronic control device connected to the drive device;

an actuator device connected to the electronic control device to cause movement of the holding device;

a first sensor device located on the steering wheel and connected to the electronic control device, the first sensor configured to detect the presence of a hand of an operator and to send a signal to the control device indicating the presence or absence of an operator's hand; and a second sensor device connected to the actuator device and the electronic control device, the second sensor device configured to detect operation of the actuator device and send a signal to the control device indicating operation of the actuator device, wherein the holding device is moveable only when the control unit receives a signal from the first sensor device detecting the presence of one of the operator's hands and a signal from the second sensor device indicating operation of the actuator device to ensure that the operator is not touching the lifting apparatus.

* * * * *

UNITED STATES PATENT AND TRADEMARK OFFICE

CERTIFICATE OF CORRECTION

PATENT NO. : 6,536,552 B2
DATED : March 25, 2003
INVENTOR(S) : Gotz

It is certified that error appears in the above-identified patent and that said Letters Patent is hereby corrected as shown below:

Column 4,
Line 52, "signal fro" should read -- signal from --
Line 61, "at least one of to the" should read -- at least one of the --.

Signed and Sealed this

Eighth Day of July, 2003

JAMES E. ROGAN
*Director of the United States Patent and Trademark Office*